US009838121B2

(12) United States Patent
Roberts et al.

(10) Patent No.: US 9,838,121 B2
(45) Date of Patent: *Dec. 5, 2017

(54) APPARATUS CONFIGURED FOR VISIBLE-LIGHT COMMUNICATIONS (VLC) USING UNDER-SAMPLED FREQUENCY SHIFT ON-OFF KEYING (UFSOOK)

(71) Applicant: Intel Corporation, Santa Clara, CA (US)

(72) Inventors: Richard D. Roberts, Hillsboro, OR (US); Mathys C. Walma, Hillsboro, OR (US); Praveen Gopalakrishnan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,612

(22) Filed: Apr. 19, 2016

(65) Prior Publication Data

US 2016/0294470 A1    Oct. 6, 2016

Related U.S. Application Data

(63) Continuation of application No. 13/977,696, filed as application No. PCT/US2011/060578 on Nov. 14, 2011, now Pat. No. 9,385,816.

(51) Int. Cl.
*H04B 10/116*    (2013.01)
*H04B 10/60*    (2013.01)
(Continued)

(52) U.S. Cl.
CPC ......... *H04B 10/116* (2013.01); *H04B 10/502* (2013.01); *H04B 10/524* (2013.01);
(Continued)

(58) Field of Classification Search
CPC .............. H04B 10/116; H04B 10/5563; H04B 10/502; H04B 10/524; H04B 10/60; H04L 27/223; H04L 25/4902; H04L 27/144
(Continued)

(56) References Cited

U.S. PATENT DOCUMENTS 4,422,099 A    12/1983  Wolfe
5,394,259 A    2/1995   Takahara
(Continued)

FOREIGN PATENT DOCUMENTS

EP    1436952 A1    7/2004
EP    2106041 A1    9/2009
(Continued)

OTHER PUBLICATIONS

"U.S. Appl. No. 13/460,224, Notice of Allowance dated Apr. 16, 2014", 13 pgs.
(Continued)

*Primary Examiner* — Leslie Pascal
(74) *Attorney, Agent, or Firm* — Schwegman Lundberg & Woessner, P.A.

(57) ABSTRACT

Embodiments may provide a way of communicating via an electromagnetic radiator, or light source, that can be amplitude modulated such as light emitting diode (LED) lighting and receivers or detectors that can determine data from light received from the amplitude modulated electromagnetic radiator. Some embodiments may provide a method of transmitting/encoding data via modulated LED lighting and other embodiments may provide receiving/decoding data from the modulated LED lighting by means of a device with a low sampling frequency such as a relatively inexpensive camera (as might be found in a smart phone). Some embodiments are intended for indoor navigation via photogrammetry (i.e., image processing) using self-identifying LED light (Continued)

anchors. In many embodiments, the data signal may be communicated via the light source at amplitude modulating frequencies such that the resulting flicker is not perceivable to the human eye.

27 Claims, 5 Drawing Sheets (51) Int. Cl.
H04L 25/49 (2006.01)
H04B 10/524 (2013.01)
H04B 10/50 (2013.01)
H04L 27/22 (2006.01)
H04L 27/144 (2006.01)
H04B 10/556 (2013.01)

(52) U.S. Cl.
CPC ......... *H04B 10/5563* (2013.01); *H04B 10/60* (2013.01); *H04L 25/4902* (2013.01); *H04L 27/144* (2013.01); *H04L 27/223* (2013.01)

(58) Field of Classification Search
USPC ......................................................... 398/172
See application file for complete search history.

(56) References Cited

U.S. PATENT DOCUMENTS

| | | | |
|---|---|---|---|
| 5,531,642 A | 7/1996 | Shiomi et al. | |
| 5,577,733 A | 11/1996 | Downing | |
| 5,600,471 A | 2/1997 | Hirohashi et al. | |
| 5,903,373 A | 5/1999 | Welch et al. | |
| 5,970,208 A | 10/1999 | Shim | |
| 6,400,482 B1 | 6/2002 | Lupton et al. | |
| 6,570,694 B1 | 5/2003 | Yegnanarayananx | |
| 6,594,050 B2 | 7/2003 | Jannson et al. | |
| 6,794,831 B2 | 9/2004 | Leeb et al. | |
| 6,819,878 B1 | 11/2004 | King et al. | |
| 6,941,076 B1 | 9/2005 | Adams et al. | |
| 6,954,591 B2 | 10/2005 | Lupton et al. | |
| 6,965,464 B2 | 11/2005 | Mossberg | |
| 7,149,256 B2 | 12/2006 | Vrazel et al. | |
| 7,415,212 B2 | 8/2008 | Matsushita et al. | |
| 7,689,130 B2 | 3/2010 | Ashdown | |
| 7,949,259 B2 | 5/2011 | Suzuki | |
| 8,070,325 B2 | 12/2011 | Zampini et al. | |
| 8,238,014 B2 | 8/2012 | Kucharski et al. | |
| 8,260,137 B2 | 9/2012 | Linnartz | |
| 8,334,901 B1 | 12/2012 | Ganick et al. | |
| 8,417,124 B2 | 4/2013 | Ford | |
| 8,488,971 B2 | 7/2013 | Linnartzx et al. | |
| 8,494,367 B2 | 7/2013 | Linnartz | |
| 8,520,065 B2 | 8/2013 | Staats et al. | |
| 8,579,437 B2 | 11/2013 | Su et al. | |
| 8,588,616 B2 | 11/2013 | Langer et al. | |
| 8,588,621 B2 | 11/2013 | Dahan et al. | |
| 8,620,165 B2 | 12/2013 | Kim et al. | |
| 8,630,549 B2 | 1/2014 | Kim et al. | |
| 8,665,508 B2 | 3/2014 | Kucharski et al. | |
| 8,693,878 B2 | 4/2014 | Schenk et al. | |
| 8,729,835 B2 | 5/2014 | Henig et al. | |
| 8,737,842 B2 | 5/2014 | Schenk et al. | |
| 8,818,204 B2 | 8/2014 | Roberts | |
| 9,385,816 B2 | 7/2016 | Roberts et al. | |
| 9,548,815 B2* | 1/2017 | Roberts | H04B 10/5563 |
| 2001/0055136 A1 | 12/2001 | Horiuchi et al. | |
| 2002/0085094 A1 | 7/2002 | Teuchert | |
| 2002/0089722 A1 | 7/2002 | Perkins et al. | |
| 2002/0145776 A1 | 10/2002 | Chow et al. | |
| 2002/0167701 A1 | 11/2002 | Hirata | |
| 2003/0053493 A1 | 3/2003 | Graham et al. | |
| 2003/0081287 A1 | 5/2003 | Jannson et al. | |
| 2004/0120025 A1 | 6/2004 | Lehoty | |
| 2005/0002673 A1 | 1/2005 | Okano et al. | |
| 2005/0135527 A1 | 6/2005 | Masui et al. | |
| 2006/0204172 A1 | 9/2006 | Shahar | |
| 2006/0239689 A1 | 10/2006 | Ashdown | |
| 2006/0269287 A1 | 11/2006 | Bidmead et al. | |
| 2007/0177161 A1 | 8/2007 | Ishii et al. | |
| 2008/0205900 A1 | 8/2008 | Cole et al. | |
| 2009/0196615 A1 | 8/2009 | Kauffman | |
| 2009/0208221 A1 | 8/2009 | Sasai | |
| 2009/0243815 A1 | 10/2009 | Tolli | |
| 2010/0060972 A1 | 3/2010 | Kucharski et al. | |
| 2010/0250125 A1 | 9/2010 | Lundberg et al. | |
| 2010/0271476 A1 | 10/2010 | Damink et al. | |
| 2010/0309958 A1 | 12/2010 | Lakkis | |
| 2011/0002695 A1 | 1/2011 | Choi et al. | |
| 2011/0069971 A1 | 3/2011 | Kim et al. | |
| 2011/0075581 A1 | 3/2011 | Mihota | |
| 2011/0144941 A1 | 6/2011 | Roberts et al. | |
| 2011/0164881 A1 | 7/2011 | Rajagopal et al. | |
| 2011/0274429 A1 | 11/2011 | Caplan et al. | |
| 2012/0008961 A1 | 1/2012 | Chen et al. | |
| 2012/0033965 A1 | 2/2012 | Zhang et al. | |
| 2012/0076498 A1 | 3/2012 | Sayeed et al. | |
| 2012/0099868 A1 | 4/2012 | Fischer et al. | |
| 2012/0109356 A1 | 5/2012 | Kong et al. | |
| 2012/0162633 A1 | 6/2012 | Roberts et al. | |
| 2012/0315036 A1 | 12/2012 | Kucharski et al. | |
| 2013/0028609 A1 | 1/2013 | Staats et al. | |
| 2013/0028612 A1 | 1/2013 | Ryan et al. | |
| 2013/0126713 A1 | 5/2013 | Haas et al. | |
| 2013/0170841 A1 | 7/2013 | Liu et al. | |
| 2013/0247117 A1 | 9/2013 | Yamada et al. | |
| 2013/0287403 A1 | 10/2013 | Roberts | |
| 2013/0301569 A1 | 11/2013 | Wang et al. | |
| 2014/0003817 A1 | 1/2014 | Roberts et al. | |
| 2014/0003823 A1 | 1/2014 | Roberts et al. | |
| 2014/0006907 A1 | 1/2014 | Roberts et al. | |
| 2014/0064739 A1 | 3/2014 | Chen et al. | |
| 2014/0086587 A1 | 3/2014 | Roberts et al. | |
| 2014/0086590 A1 | 3/2014 | Ganick et al. | |
| 2014/0093126 A1 | 4/2014 | Roberts | |
| 2014/0093234 A1 | 4/2014 | Roberts et al. | |
| 2014/0093238 A1 | 4/2014 | Roberts | |
| 2014/0093249 A1 | 4/2014 | Roberts et al. | |
| 2014/0153668 A1 | 6/2014 | Xi et al. | |
| 2014/0219663 A1 | 8/2014 | Roberts | |
| 2014/0280316 A1* | 9/2014 | Ganick | G06F 17/30522 707/769 |
| 2014/0308048 A1 | 10/2014 | Roberts et al. | |

FOREIGN PATENT DOCUMENTS

| | | |
|---|---|---|
| JP | 2010014408 A | 1/2010 |
| JP | 2010283616 A | 12/2010 |
| JP | 5031427 B2 | 9/2012 |
| KR | 1020060034883 A | 4/2006 |
| KR | 100761011 B1 | 9/2007 |
| KR | 1020110083961 A | 7/2011 |
| KR | 101075747 B1 | 10/2011 |
| KR | 1020120006306 A | 1/2012 |
| WO | WO-2008113861 A2 | 9/2008 |
| WO | WO-2011064342 A1 | 6/2011 |
| WO | WO-2012037528 A2 | 3/2012 |
| WO | WO-2012087944 A2 | 6/2012 |
| WO | WO-2013048502 A1 | 4/2013 |
| WO | WO-2013074065 A1 | 5/2013 |
| WO | WO-2013165751 A1 | 11/2013 |
| WO | WO-2014046757 A1 | 3/2014 |
| WO | WO-2014051754 A1 | 4/2014 |
| WO | WO-2014051767 A1 | 4/2014 |
| WO | WO-2014051768 A1 | 4/2014 |
| WO | WO-2014051783 A1 | 4/2014 |

OTHER PUBLICATIONS

"U.S. Appl. No. 13/538,888, Notice of Allowance dated Jun. 17, 2014", 11 pgs.
"U.S. Appl. No. 13/539,354, Notice of Allowance dated Apr. 1, 2014", 5 pgs.

(56) References Cited

OTHER PUBLICATIONS

"U.S. Appl. No. 13/625,361, Non Final Office Action dated Jul. 31, 2014", 11 pgs.
"U.S. Appl. No. 13/977,696, Corrected Notice of Allowance dated Aug. 7, 2015", 2 pgs.
"U.S. Appl. No. 13/977,696, Non Final Office Action dated Oct. 23, 2015", 6 pgs.
"U.S. Appl. No. 13/977,696, Notice of Allowance dated Mar. 4, 2016", 5 pgs.
"U.S. Appl. No. 13/977,696, Notice of Allowance dated Jun. 22, 2015", 8 pgs.
"U.S. Appl. No. 13/977,696, Notice of Allowance dated Jul. 21, 2015", 4 pgs.
"U.S. Appl. No. 13/977,696, Preliminary Amendment filed Jun. 29, 2013", 8 pgs.
"International Application Serial No. PCT/US2011/054441, International Preliminary Report on Patentability dated Apr. 10, 2014", 8 pgs.
"International Application Serial No. PCT/US2011/054441, International Search Report dated Apr. 23, 2012", 3 pgs.
"International Application Serial No. PCT/US2011/054441, Written Opinion dated Arp. 23, 2012", 6 pgs.
"International Application Serial No. PCT/US2011/060578, International Preliminary Report Patentability dated May 30, 2014", 6 pgs.
"International Application Serial No. PCT/US2011/060578, International Search Report dated Mar. 15, 2012", 4 pgs.
"International Application Serial No. PCT/US2011/060578, Written Opinion dated Mar. 15, 2012", 4 pgs.
"International Application Serial No. PCT/US2013/037787, International Search Report dated Aug. 12, 2013", 3 pgs.
"International Application Serial No. PCT/US2013/037787, Written Opinion dated Aug. 12, 2013", 4 pgs.
"International Application Serial No. PCT/US2013/046224, International Search Report dated Sep. 16, 2013", 3 pgs.
"International Application Serial No. PCT/US2013/047343, International Search Report dated Oct. 7, 2013", 3 pgs.
"International Application Serial No. PCT/US2013/047343, Written Opinion dated Oct. 7, 2013", 6 pgs.
"International Application Serial No. PCT/US2013/047347, International Search Report dated Aug. 27, 2013", 3 pgs.
"International Application Serial No. PCT/US2013/047347, Written Opinion dated Aug. 27, 2013", 8 pgs.
/,"International Application Serial No. PCT/US2013/047350, International Search Report dated Sep. 25, 2013", 3 pgs.
"International Application Serial No. PCT/US2013/047350, Written Opinion dated Sep. 25, 2013", 6 pgs.
"International Application Serial No. PCT/US2013/047772, International Search Report dated Sep. 27, 2013", 3 pgs.
"International Application Serial No. PCT/US2013/047772, Written Opinion dated Sep. 27, 2013", 5 pgs.
Daisuke, et al., "A Hybrid and Linear Registration Method Utilizing Inclination Constraint", ISMAR '05 Proceedings of the 4th IEEE/ACM International Symposium on Mixed and Augmented Reality, (2005), 140-149.
Horikawa, et al., "Pervasive Visible Light Positioning System using White LED Lighting", vol. 103; No. 721(CS2003 178-197), (2004), 93-99.
Tanaka, et al., "New Position Detection Method using Image Sensor and Visible Light LEOs", IEEE Second International Conference on Machine Vision, (Dec. 2009), 150-153.
Wikipedia, "Rotation matrix", [Online] retrieved from the internet: <http://en.wikipedia.org/wiki/Rotation_matrix>, (Nov. 1, 2012), 1-22.
Yoshino, et al., "High-accuracy Positioning System using Visible LED Lights and Image Sensor", IEEE, (2008), 439-442.

\* cited by examiner

APPARATUS CONFIGURED FOR VISIBLE-LIGHT COMMUNICATIONS (VLC) USING UNDER-SAMPLED FREQUENCY SHIFT ON-OFF KEYING (UFSOOK)

This application is a continuation of U.S. patent application Ser. No. 13/977,696, filed Mar. 19, 2014, which is a U.S. National Stage Filing under 35 U.S.C. 371 from International Application No. PCT/US2011/060578, filed Nov. 14, 2011 and published in English as WO 2013/074065 on May 23, 2013, each of which is incorporated herein by reference in its entirety.

BACKGROUND

The present disclosure relates generally to communication technologies. More particularly, the present disclosure relates to transmitting data by varying a frequency of amplitude-modulation of a light source to generate light and receiving the data by undersampling frequencies of modulation of the light.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Embodiments relate to communicating data by varying a frequency of an amplitude modulated electromagnetic radiator, or light source. Embodiments may comprise logic such as hardware and/or code to vary a frequency of an amplitude-modulated light source such as a visible light source, an infrared light source, or an ultraviolet light source. For instance, a visible light source such as a light emitting diode (LED) may provide light for a room in a commercial or residential building. The LED may be amplitude modulated by imposing a duty cycle that turns the LED on and off. In some embodiments, the LED may be amplitude modulated to offer the ability to adjust the perceivable brightness, or intensity, of the light emitted from the LED. Embodiments may receive a data signal and adjust the frequency of the light emitted from the LED to communicate the data signal via the light. In many embodiments, the data signal may be communicated via the light source at amplitude modulating frequencies such that the resulting flicker is not perceivable to the human eye.

Embodiments may provide a way of communicating via light sources that can be amplitude modulated such as LED lighting and receivers or detectors that can determine data from the amplitude modulated light sources. Some embodiments may provide a method of transmitting/encoding data via modulated LED lighting and other embodiments may provide receiving/decoding data from the modulated LED lighting by means of a device with a low sampling frequency such as a relatively inexpensive camera (as might be found in a smart phone). Such embodiments overcome some issues related to the sampling rate of the camera being very low (typically 100 frames per second or less) and avoidance of modulation of LED lighting that may cause noticeable or perceivable flicker to the human eye. Some embodiments are intended for indoor navigation via photogrammetry (i.e., image processing) using self-identifying LED light anchors and can be useful for markets involving, e.g., indoor navigation capabilities like "smart shopping".

Embodiments may encode bits of data via frequency shift keying of a repetitive ON/OFF keying waveform and applying the waveform or signal to a driver of the light source to adjust the frequency of modulation of the light source based upon the changes in the frequency of the waveform. The frequency range of the ON/OFF keying can be high enough to prevent flicker (e.g., greater than 100 Hz) but when sampled (more precisely subsampled at a rate below the Nyquist rate) by, e.g., a smart phone camera, the data modulation aliases to frequency components that can be image processed (over the duration of a short video or a series of images) to decode the modulation information.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Wireless embodiments may integrate low power wireless communications like Bluetooth®, wireless local area networks (WLANs), wireless metropolitan area networks (WMANs), wireless personal area networks (WPAN), cellular networks, and/or Institute of Electrical and Electronic Engineers (IEEE) standard 802.15.4, "Wireless Medium Access Control (MAC) and Physical Layer (PHY) Specifications for Low Rate Wireless Personal Area Networks (LR-WPANs)" (2006) (http://standards.ieee.org/getieee802/download/802.15.4-2006.pdf), communications in networks, messaging systems, and smart-devices to facilitate interaction between such devices. Furthermore, some wireless embodiments may incorporate a single antenna while other embodiments may employ multiple antennas. For instance, multiple-input and multiple-output (MIMO) is the use of multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Figure 1:
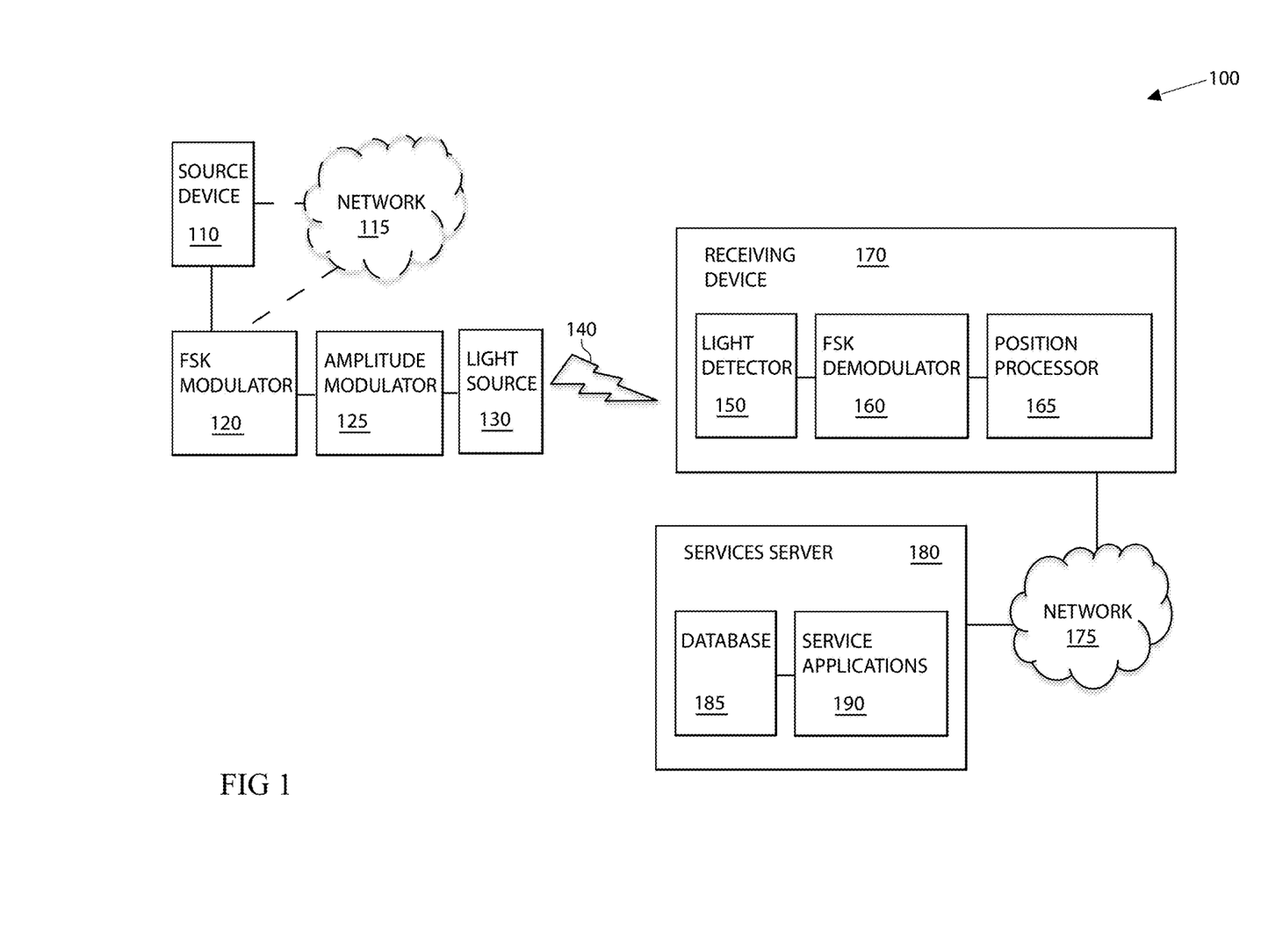
FIG. 1 depicts an embodiment of a system including devices to transmit and to receive data communicated by varying a frequency of an amplitude-modulated light source.

Turning now to FIG. 1, there is shown an embodiment of a system 100 system including devices to transmit and to receive data communicated by varying a frequency of an amplitude-modulated light source. System 100 comprises a source device 110, a network 115, a frequency shift keying (FSK) modulator 120, an amplitude modulator 125, a light source 130 to transmit light 140, a light detector 150, an FSK demodulator 160, and a receiving device 170. System 100 also includes a network 175 communicatively coupling the receiving device 170 and a services server 180 to facilitate services such as "smart shopping". System 100 may communicate data originating from the source device 110 to the receiving device 170 wirelessly via the light source 130. For example, the light source 130 may be a visible light source to provide light for areas within a shopping mall. The light source 130 may provide an identification number, or unique number, as a bit sequence that may facilitate a determination of the location of the receiving device 170 within the shopping mall. In many embodiments, the receiving device 170 may simultaneously receive modulated light from multiple light sources such as the light source 130 to facilitate determining the location of the receiving device 170 by, e.g., triangulation.

The source device 110 may couple with the FSK modulator 120 to provide data to the FSK modulator 120 to transmit via the light source 130. The source device 110 may transmit a data signal to the FSK modulator 120 so the data may be transmitted to the receiving device 170. In some embodiments, the source device 110 may comprise a processor-based device such as a desktop computer, a notebook, a laptop, a Netbook, a smartphone, a server, or the like that is capable of transmitting a data signal to the FSK modulator 120. In further embodiments, the source device 110 may be integrated with the FSK modulator 120 or both the source device 110 and the FSK modulator 120 may comprise parts of another device.

In some embodiments, the source device 110 may comprise a bit shift circulating register to shift bits comprising an identification number (a bit sequence) that is unique for the light source 130 through a series of registers in order and to the FSK modulator 120. In some embodiments, however, the uniqueness of the identification number may be relative to nearby light sources. In many of these embodiments, the order and content of the bits of the data may establish the timing of frequency changes to the amplitude modulation of light emitted from the light source 130.

In an alternative embodiment, as indicated by the dashed lines, the source device 110 may comprise a local network interface to communicatively couple the source device 110 with the FSK modulator 120 via the network 115. For instance, the network 115 may comprise a physical and/or wireless network such as a corporate intranet, wireless local area network (WLAN), a local area network (LAN), or other network capable of communicating data between devices. In some embodiments, the network 115 may comprise a distinct network from the network 175 in a physical or logical sense to, e.g., separate business operations from public operations. In some of these embodiments, both networks 115 and 175 may couple with a larger network such as a metropolitan area network or the Internet.

The FSK modulator 120 may receive the data signal from the source device 110 and couple with the amplitude modulator 125 to modulate the light 140 emitted by the light source 130 in a pattern that facilitates communication of data from the data signal. The FSK modulator 120 may communicate by modulating logical ones and zeros at different frequencies. For example, the FSK modulator 120 may generate an output signal at a first frequency to communicate a logical zero and generate the output signal at a second frequency to communicate a logical one. The amplitude modulator 125 may modulate the amplitude of the light 140 at the frequencies established by the output signal of the FSK modulator 120 and drive the light source to communicate the data via the light 140 emitted from the light source 130.

The FSK modulator 120 may transmit the same data repeatedly to facilitate receipt of the data by the receiving device 170. For instance, the FSK modulator 120 may transmit the data to the receiving device 170 multiple times and consecutively to allow the receiving device 170 to sample the amplitude-modulated light multiple times for each bit at a sampling frequency that is lower than or equal to the first frequency or the second frequency.

In many embodiments, the FSK modulator 120 may generate output signals at specific tones such as one times (1×) the sampling frequency, one point two-five times (1.25×) the sampling frequency, one point five times (1.5×) the sampling frequency, one point seven-five times (1.75×) the sampling frequency, two times (2×) the sampling frequency, two point two-five times (2.25×) the sampling frequency, and the like. In several embodiments, the first frequency may be a harmonic frequency or overtone frequency of the sampling frequency and the second frequency may be halfway between the harmonic or overtone frequencies. For example, the first frequency may be 1× the sampling frequency and the second frequency may be 1.5× the sampling frequency. In another embodiment, the first frequency may be 1.5× the sampling frequency and the second frequency may be 2× the sampling frequency.

In many embodiments, the FSK modulator 120 may generate an output signal at a delimiter frequency prior to each repetition of the transmission of the data to delimit or demark the start of a data transmission and/or the end of a data transmission. For example, the FSK modulator 120 may generate the output signal at a delimiter frequency that is between the first frequency and the second frequency. In many embodiments, the delimiter frequency may be halfway between the first frequency and the second frequency such as 1.25× the sampling frequency, 1.75× the sampling frequency, 2.25× the sampling frequency, or the like.

For embodiments that utilize a visible light source 130, the light 140 may be modulated at a frequency that is not visible to the human eye such as a frequency above 60 Hertz (Hz) or, in many embodiments, above 100 Hz. For instance, if the sampling frequency of the receiving device 170 is 60 Hz then the FSK modulator 120 may modulate the first frequency at 60 Hz, the delimiter frequency at 75 Hz, and the second frequency at 90 Hz. In other embodiments, the FSK modulator 120 may modulate the first frequency at a minimum of 120 Hz, the delimiter frequency at a minimum of 135 Hz, and the second frequency at a minimum of 150 Hz.

The FSK modulator 120 may modulate the light 140 emitted from the light source 130 via the amplitude modulator 125 by switching the power to the light source 130 to turn the light 140 on and turn the light 140 off at the frequency of the output signal. The light source 130 may comprise an electromagnetic radiator that can be amplitude modulated such as a light emitting diode. The amount of data that may be communicated via, e.g., a visible light source without producing flicker perceivable by a human eye can vary based upon the speed with which the light source 130 can be amplitude modulated as well as the speed with which the receiving device 170 can capture and process samples from the light 140. In some embodiments, the light source 130 may comprise a visible light source. In some embodiments, the light source 130 may comprise an infrared light source. And, in some embodiments, the light source 130 may comprise an ultraviolet light source.

The light source 130 illustrated in FIG. 1 may be one light source of many light sources. For instance, the light source 130 may be a light source in one light fixture of many light fixtures in a shopping mall. In some embodiments, more than one of the light fixtures may comprise light sources transmitting the same data. For example, a department store may have hundreds of light fixtures. Each light fixture or every other light fixture may comprise a light source like 130 that can be amplitude modulated and each of those light sources may transmit a unique identification number. The receiving device 170 may be a smart phone of a user looking for a particular item within the department store and the user may wish to find a particular item in the store. In the department store, the light sources may repeatedly transmit their respective identification numbers, such as 10 bit identification codes. Upon entering the department store, the receiving device 170 may begin to receive the transmissions of the identification numbers from the light sources. The receiving device 170 may process the signals to determine the frequency modulations and associate the frequency modulations with the identification numbers for a number of the light sources. The receiving device 170 may transmit the identification numbers to the services server 180 via the network 175 and, in response, the receiving device 170 may receive an indication of the location, such as a three dimensional location, of the receiving device 170 and/or the location of the particular item within the department store with respect to the location of the receiving device 170 and the user.

The light source 130 emits modulated light 140 with the data from the data signal at a location at which the light detector 150 can receive the light 140.

The receiving device 170 may comprise a hardware device to interact with a user of the receiving device 170. In many embodiments, the receiving device 170 may be a portable device such as a portable data assistant, a smart phone, a camera, a laptop, a notebook, a netbook, an iPad, an iPhone, or the like. The receiving device 170 comprises a light detector 150 and an FSK demodulator 160 to receive and interpret the frequency-modulated light from the light source 130 and other such light sources by undersampling the light emitted by the light sources such as light source 130. In many embodiments, the receiving device 170 also comprises a position processor 165 to determine the position of the receiving device 170 based upon the identification numbers of the light sources identified by the FSK demodulator 160.

The light detector 150 may convert the light 140 into an electrical signal, such as a pixel of an image representative of the light 140 or a current of a photo diode. For example, the light detector 150 may comprise a camera or an array of photo detectors. The light detector 150 may capture an image of light sources including light source 130 and may comprise storage logic (not shown) to store the image to a storage medium such as dynamic random access memory (DRAM), a flash memory module, a hard disk drive, a solid-state drive such as a flash drive or the like.

The light detector 150 may also comprise sample logic to determine samples of the waveform of the amplitude-modulated light from images captured by the light detector 150. For instance, the sample logic may identify pixels from the image associated with light sources to identify the light sources and may determine the state of the identified light sources, i.e., whether the image indicates that a light source is emitting light (the light source is on) or the light source is not emitting light (the light source is off). In some embodiments, the sample logic may assign a value to a light source in the on state such as a value of one (1) and a value of a light source in the off state such as a negative one (−1). In such embodiments, the samples may include a value as well as a time indication.

The light detector 150 may capture images at a sampling frequency (Fs). The sampling frequency may be a limitation of the receiving device 170 in some embodiments and may be a setting of the receiving device 170 in other embodiments. In further embodiments, another signal or user notification may indicate the sampling frequency for which the FSK modulator 120 is configured and the receiving device 170 may adjust the sampling frequency of the light detector 150 to match that sampling frequency either automatically or with some interaction with the user.

The light detector 150 may sample or capture samples indicative of the frequency of the amplitude-modulated light 140 at the sampling frequency, undersampling the signal transmitted via the light 140. This process of undersampling effectively aliases the frequency of the signal transmitted via the light 140 to a lower frequency. For embodiments in which the first frequency is an integer multiple (N*Fs) of the sampling frequency and the second frequency is an integer plus one half multiple (N+1/2)*Fs, which is a harmonic or overtone of the sampling frequency, the sample logic captures samples of the first frequency that appear to be at a frequency that is at zero Hz and samples of the second frequency that appear to be at a frequency that is half of the sampling frequency.

The FSK demodulator 160 couples with the light detector 150 to receive the samples, to determine the bit or bits represented by the light, and to output the bits to, e.g., the services server 180. As a result of the undersampling, the first frequency may appear to the FSK demodulator 160 to be approximately a waveform at zero Hz with an assigned value that is either the minimum value, e.g., −1, or the maximum value, e.g., 1, throughout the waveform. The second frequency may appear to the FSK demodulator 160 to be approximately a signal with the frequency of the sampling frequency divided by two, alternating between a high and a low value. And the delimiter frequency, which may be approximately halfway between the first frequency and the second frequency, may appear to be a half the frequency of the second frequency, switching between the minimum value and the maximum value at half the speed of the second frequency and including two lows and two highs. For instance, depending upon the time at which the sampling begins, the delimiter frequency may provide one of four patterns of samples including: (1) Low-Low-High-High, (2) High-High-Low-Low, (3) Low-High-High-Low, and (4) High-Low-Low-High.

The FSK demodulator 160 may process the samples to determine frequency components of the waveform transmitted by the light source 130. In some embodiments, the frequency components may be determined by performing a Fourier transform on the samples received from the light detector 150. For example, the FSK demodulator 160 may perform a fast Fourier transform (FFT) to determine the amplitudes of the waveforms at various frequencies and may make bit decisions incoherently using only the FFT amplitudes to associate the frequency modulations of the light with bits of data. The number of points in the FFT is dependent upon the data rate. In one embodiment, the FSK demodulator 160 may perform a four point FFT. The four point FFT is used when operating at the highest data rate for sampling, which is BIT_RATE=Fs/2. For embodiments in which the highest bit rate may not be used, such as BIT_RATE=Fs/10, the number of points in the FFT would be more than four. Other embodiments may use a discrete Fourier transform (DFT) in lieu of the FFT. By associating the frequency components identified with a logical zero or a logical one, the FSK demodulator 160 may determine the identification number associated with the light source 130.

Furthermore, the FSK demodulator 160 may identify the delimiter frequency to determine the point at which the data being transmitted by the light source 130 begins. In other words, the FSK demodulator 160 may identify the delimiter frequency to determine the point at which the data starts in the transmission from the light source 130.

The receiving device 170 may also comprise a position processor 165. The position processor 165 may determine the position of the receiving device 165 based upon the identification numbers determined by the FSK demodulator 160. For example, the light source 130 may comprise one of many light sources in a warehouse. The light sources may transmit their respective identification numbers and the position processor 165 may receive the identification numbers from the receiving device 170. The particular identification numbers identified by the receiving device 170 and, in some embodiments, the timing of receipt of the identification numbers, may provide information to the position processor 165 to identify the location of the receiving device 170 and, in some embodiments, the direction of movement of the receiving device 170. In particular, the position processor 165 may interact with the services server 180 to obtain data about the light sources associated with the identification numbers from the database 185.

In some embodiments, the position processor 165 may compare the identification numbers received from the FSK demodulator 160 against identification numbers stored in the database 185, associate the identification numbers with the locations of the light sources such as light source 130 and determine the specific location of the receiving device 170 based upon the locations of the light sources identified by the identification numbers via database 185. The receiving device 160 may communicate with the services server 180 to obtain services such as directing the user of the receiving device 170 to a particular object in the warehouse, a particular location of interest in the warehouse, showing a map of the warehouse with the user's current location, showing the location of another receiving device in the warehouse, or other service that relates to the users location or the location of a receiving device.

The receiving device 170 may obtain the services by, e.g., downloading one or more service applications 190, downloading maps, requesting location information for particular items or other locations of interest, downloading part or all of the database 185, or the like. In one embodiment, the location information for the light sources such as the x,y,z coordinates of the light source 130 may be downloaded or at least begin to be downloaded by the receiving device 170 upon entering a facility offering such services. In some embodiments, the receiving device 170 may provide the location of the receiving device 170 to the services server 180 to obtain services. In alternative embodiment, the receiving device 170 may provide the identification numbers for the light sources such as light source 130 to the services server 180 to obtain the location of the receiving device 170 and/or services for the user of the receiving device 170.

The database 185 may comprise identification numbers and associated location information such as the x,y,z coordinates of the light sources. Based upon this information, the location processor 165 may calculate the location of the receiving device 170. In other embodiments, the results of calculations for locations of the receiving device 170 in the warehouse may be stored in the receiving device 170 for future reference. In several embodiments, the potential locations of the receiving device 170 may be predetermined so that the database 185 contains location information for the receiving device 170 associated with groups of identification numbers. The location processor 165 may look up the location of the receiving device 170 based upon the identification numbers provided by the FSK demodulator 160. In still other embodiments, the locations of the receiving device may be partially calculated and stored in the database 185 and in some of these embodiments, the partial calculations may be downloaded to the receiving device 170.

Figure 2:
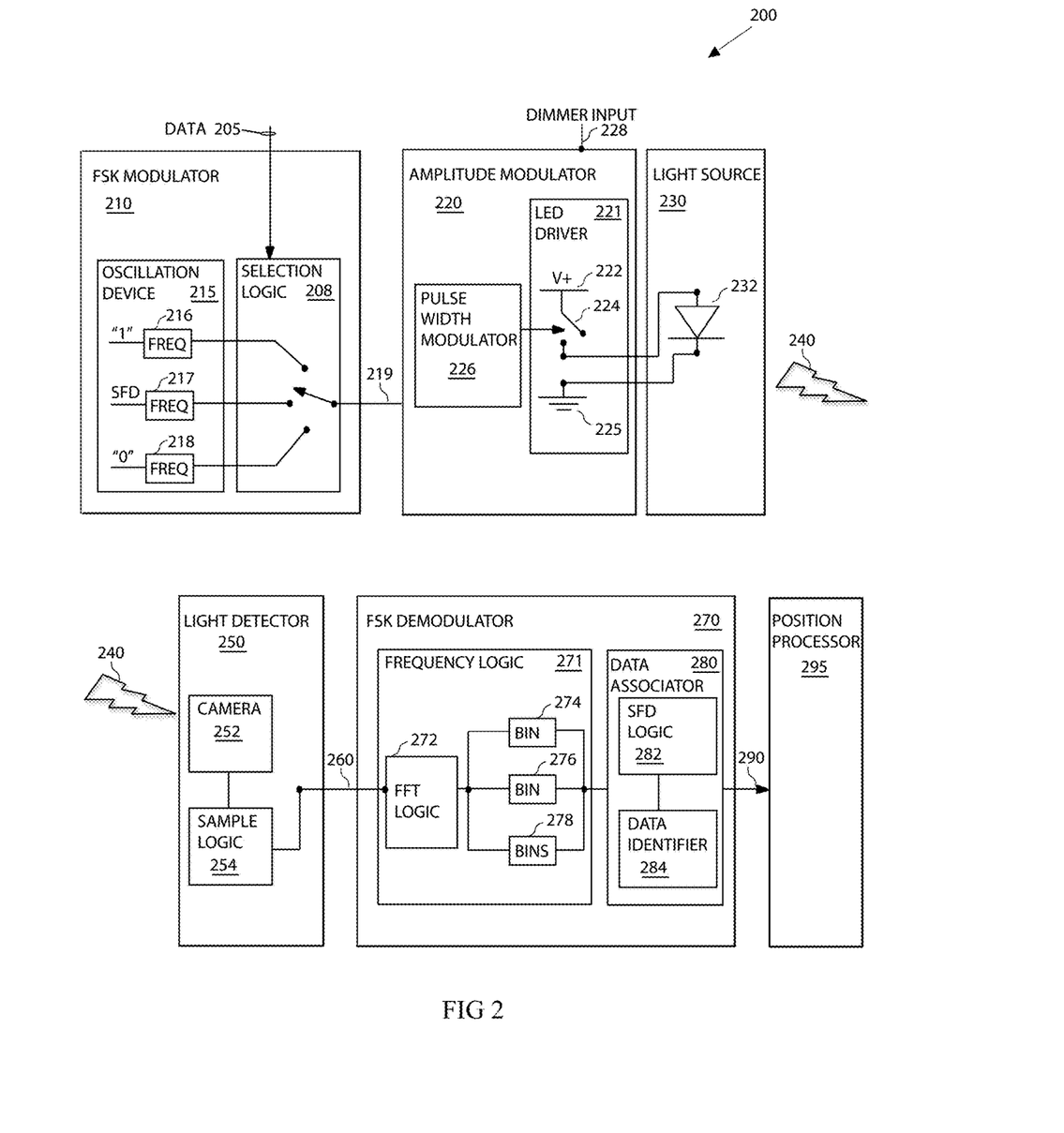
FIG. 2 depicts an embodiment of apparatuses to transmit and to receive data communicated by varying a frequency of amplitude-modulation of a light source.

FIG. 2 depicts an embodiment of apparatuses 200 to transmit and to receive data 205 communicated by varying a frequency of amplitude modulation of a light source 230. For instance, lighting in a department store may communicate data to smart devices such as smart phones of customers to provide information about special sales or to offer coupons for products.

Apparatuses 200 comprise an FSK modulator 210, an amplitude modulator 220, a light source 230 to produce light 240, a light detector 250, and an FSK demodulator 270. The FSK modulator 210 may modulate the frequency of amplitude modulation of the light 240 based upon the data 205. FSK modulator 210 may comprise an oscillation device 215 to oscillate an output signal 219 at frequencies representative of one or more bits of the data 205. For example, the oscillation device 215 may comprise three frequency outputs: a frequency 216 representative of a logical 1 bit, a delimiter frequency 217 representative of a start of frame delimiter (SFD), and a frequency 218 representative of a logical 0 bit.

The frequencies 216, 217, and 218 may be related in that frequency 216 may be an integer multiple of the sampling frequency, N*Fs, wherein N is an integer (1, 2, 3, 4, 5, 6, . . . ) and Fs is the sampling frequency of the light detector 250. Frequency 218 may be (N+1/2)*Fs, and frequency 217 may be (N+1/4)*Fs. Or frequency 218 may be (N−1/2)*Fs, and frequency 217 may be (N−1/4)*Fs. In other embodiments, the frequency 216 may be an integer multiple of the sampling frequency, (N+1)*Fs, frequency 218 may be (N+1/2)*Fs or (N−1/2)*Fs, and frequency 217 may be (N+3/4)*Fs or (N−3/4)*Fs. Note that the associations of the logical 1 with frequency 216 and the logical 0 with frequency 218 are for the purposes of illustration only and these logical bit associations can be reversed in some embodiments.

The FSK modulator 210 may generate the oscillating signal at the different frequencies by repeatedly transmitting a bit pattern of the oscillating signal at a predetermined clock rate. For instance, an oscillating signal generated by an oscillator may be sampled at a high clock rate and the samples may be stored on an integrated circuit (a "chip"). To reproduce the signal, the samples may be transmitted at the high clock rate. Oscillators and oscillation devices described hereafter may refer to oscillators, may refer to integrated circuits used to transmit samples obtained from oscillating signals, may refer to integrated circuits that otherwise simulate oscillating signals, or may refer to any other device that generates an oscillating signal or a signal that mimics an oscillating signal.

The FSK modulator 210 may also comprise selection logic 219 to select a frequency of the output signal 219 based upon the data 205. In some embodiments, the data 205 may comprise a sequence of bits representative of the start of frame delimiter that will cause the selection logic 208 to select the delimiter frequency 217. In other embodiments, the selection logic 208 may select the delimiter frequency 217 prior to transmitting the data 205 and/or after transmitting the data 205. In the latter embodiments, bits of the data 205 may act as place holders or fill for transmission of the delimiter frequency 217 for the purposes of maintaining the timing of the transmission of the bits of data 205. FSK modulator 210 may repeat the transmission of the data 205 continuously or for a particular number of transmissions in the form of the frequency-modulated output signal 219.

In many embodiments, data 205 may comprise the same number of bits of data 205 to transmit in a packet for every per transmission so the FSK modulator 210 may transmit data 205 in the same size packets such as packets of 16 bits. In other embodiments, FSK modulator 210 may be capable of identifying bits representing the SFD so the FSK modulator 210 may be capable of transmitting packets of varying numbers of bits.

The input of amplitude modulator 220 couples with the output of FSK modulator 210 to receive the output signal 219. The amplitude modulator 220 may apply the output signal 219 to the LED driver 221 to connect and disconnect the light source 230 from a power source 222. In the present embodiment, the LED driver 221 is illustrated as a switch 224 that opens and closes at the frequency of the output signal 219. For instance, when the switch 224 is open, the circuit between the voltage illustrated as the power source 222 and ground 225 is opened, turning off the LED 232. When the switch 224 is closed, the circuit between the voltage illustrated as the power source 222 and ground 225 is closed, drawing a current from the power source 222 through the LED 232, turning on the LED 232 to generate light 240. In some embodiments, the switch 224 may comprise one or more transistors. While the present embodiment illustrates the LED 232, embodiments may utilize any electromagnetic radiator that can be amplitude modulated.

The light 240 may comprise light that is modulated between two or more states such as an "off" state and an "on" state at a frequency of the output signal 219. In several embodiments, the light comprises visible light. In other embodiments, light source 230 may generate infrared light, ultraviolet light, or visible light. In further embodiments, the light source 230 may switch between two different "on" states such as a full-power state in which the full-rated current or voltage for the light source 230 is applied to the light source 230 and a half-power state in which half the rated current or voltage is applied to the light source 230 to generate the light 240. In still further embodiments, the light source 230 may comprise multiple sources such as multiple LEDs and less than all of the light sources may be turned off to create a "partially on" state for modulation.

In some embodiments, amplitude modulator 220 comprises pulse-width modulation logic 226 to adjust the duty cycle of the light 240 or, in other words, vary the percentage of time that the light source 232 is on. For instance, the duty cycle of the light 240 without the pulse-width modulation logic 226 may be at 50 percent. The 50 percent duty cycle means that the light 240 generated by the LED 232 is on 50 percent of the time and off 50 percent of the time. The effect of the 50 percent duty cycle is that the intensity of the light 240 is half of the intensity if the LED 232 were turned on 100 percent of the time, i.e., no amplitude modulation. The pulse-width modulation logic 226 may adjust the percentage of time that the light source 230 is on during the duty cycle to provide a dimming circuit for the light source 230. For example, the pulse-width modulation logic 226 may be adjustable via a knob or switch for the light source 230 so a user may dim the light 240 or increase the brightness or intensity of the light 240 via a dimmer input 228 while the light 240 is still modulated at the frequency of the output signal 219.

In some embodiments, the amplitude modulator may overdrive the LED 232 so that the light brightness is not derated by the modulation. For example, the "Off" state may be defined as when the light 240 is at 50% illumination or intensity and the "On" state may be defined as when the light 240 is at 150% illumination. Assuming a 50 percent duty cycle, the average output of LED 232 may remain at 100 percent of the illumination.

A receiving device may receive the light 240, such as the receiving device 170 in FIG. 1, via a light detector 250 and an FSK demodulator 270. The light detector 250 may receive the light 240 and generate an electrical signal 260 based upon the light 240 at a frequency of the amplitude modulation of the light 240. For instance, when the amplitude modulator 220 modulates the light 240 at the frequency 218 at 100 Hz, the light detector 250 may generate an electrical signal 260 with energy primarily transmitted at 100 Hz.

The light detector 250 may comprise a camera 252 and sample logic 254. The camera 252 may be capable of capturing frames of video at a sampling rate of 100 Hz and the FSK modulator 210 may be tuned for a sampling frequency (Fs) of 100 Hz. The camera 252 may capture multiple frames of video and each frame of video may be analyzed by the sample logic 254 to determine the number of light sources 230 associated with each frame, to associate the light sources of a first frame with the same light sources in a subsequent frame, and to determine whether the light sources are emitting light in each of the frames. For instance, the sample logic 254 may identify the light source 230 in a first frame. The sample logic 254 may then identify the light source 230 in three subsequent frames. The sample logic 254 may determine that the light source is on in the first frame, off in the second frame, on in the third frame, and off in the fourth frame. Upon determining samples 260, the light detector 250 may output the samples 260 to the FSK demodulator 270 for interpretation.

The FSK demodulator 270 receives the samples 260 from the light detector 250 and determines bits of the data 205 transmitted to the light detector 250 from the light source 230. The FSK demodulator 270 may comprise frequency logic 271 and data associator 280. The frequency logic 271 may determine frequency components of the signal represented by the samples 260 and the data associator 280 may associate the frequency components with the delimiter frequency, identifying the SFD, or associate the frequency components with bits of the data 205 to output data 290 to a position processor 295.

In the present embodiment, the frequency logic 271 comprises FFT logic 272, a frequency bin 274, a frequency bin 276, and frequency bins 278. The FFT logic 272 may comprise, e.g., a four point FFT logic and may transform the time domain waveform samples 260 into frequency domain representations of the samples 260 to generate the frequency components and output the magnitudes of the frequency components into the respective frequency bins 274, 276 and 278. Data associator 280 may determine the bit associations with the samples based upon the magnitudes of the frequency components in the respective frequency bins 274, 276 and 278. For example, the frequency bin 274 may be associated with the logical 0, the frequency bin 276 may be associated with a logical 1, and the frequency bins 278 may be associated with the delimiter frequency.

The data associator 280 may comprise SFD logic 282 to determine that the frequency components determined by frequency logic 271 are associated with the start frame delimiter (SFD) and begin to output data in response to bit decisions for data immediately following the receipt of the SFD. For instance, data associator 280 may receive two cycles of frequency components having the greatest magnitude in the frequency bins 278 and determine that the subsequent data will comprise data such as the identification number (or bit sequence) associated with the light source 230. In further embodiments, the data associator 280 may determine that the data being transmitted has ended upon receipt of the SFD, facilitating transmission of variable length data packets from light source 230.

The data associator 280 may comprise a data identifier 284 to determine data 290 via bit decisions based upon the magnitudes of the frequency components in the bins 274, 276, and 278. The data identifier 284 may comprise logic to associate frequency components having the most significant magnitudes in the frequency bin 274 with a logical 0 and the frequency components having the most significant magnitudes in the frequency bin 276 with a logical 1. The data identifier 284 may output data representative of these bit decisions.

The position processor 295 may receive the identification number of the light source 230 as well as identification numbers for one or more other light sources. Based upon the identification numbers for the light sources, the position processor 295 may determine the location of the receiving device. In some embodiments, the position processor 295 may access a database to determine the locations of the light sources. In further embodiments, the position processor 295 may access a database to retrieve other information related to the position of the receiving device based upon the identification numbers.

In some embodiments, the position processor 295 may be integrated with or coupled with the receiving device. In other embodiments, the database may be remote from the receiving device and access wirelessly to obtain data related to the location of the light sources and/or data related to the location of the receiving device.

Figure 3:
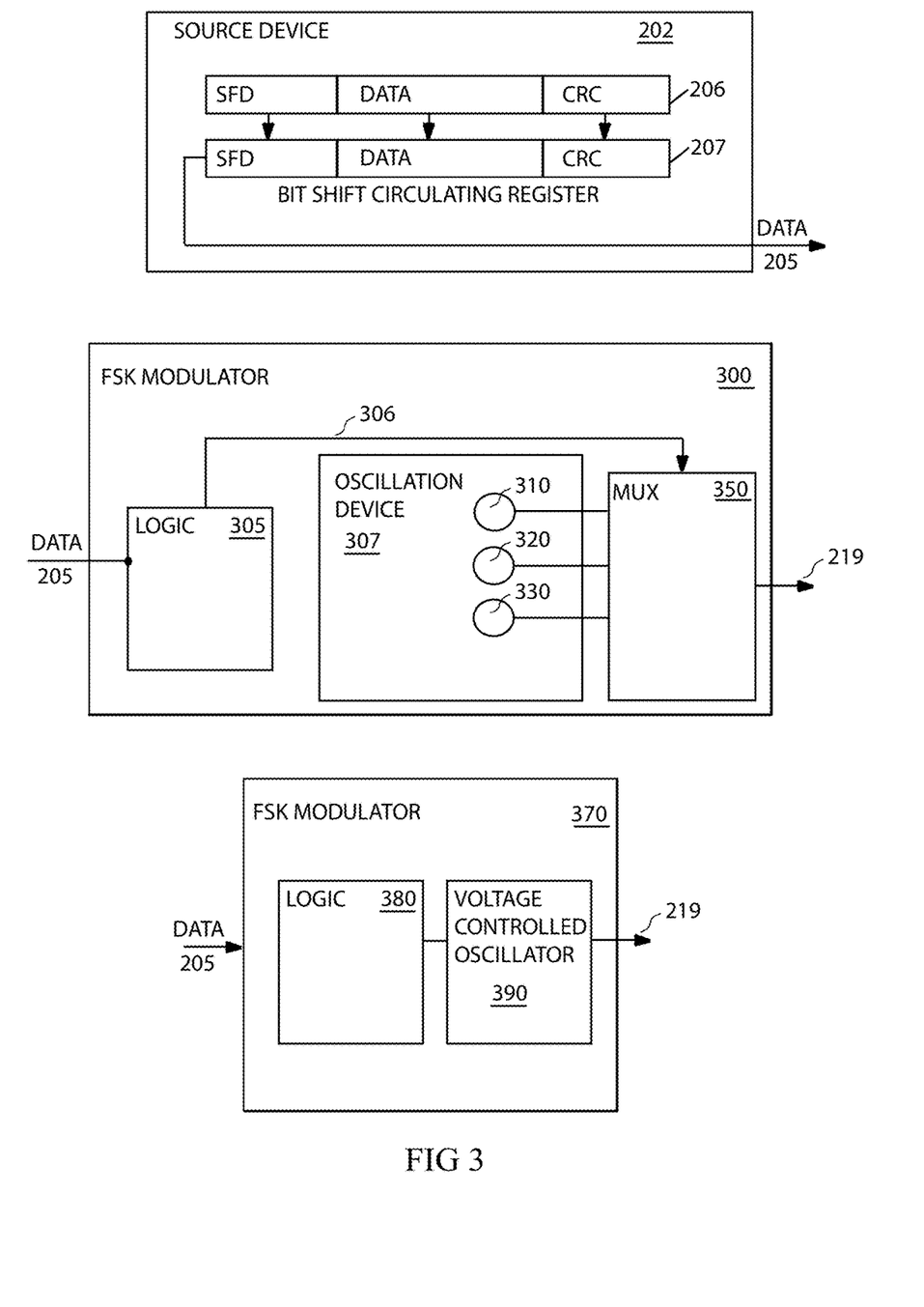
FIG. 3 illustrates one embodiment of a source of data and alternative embodiments of a frequency shift keying (FSK) modulator.

Referring also to FIG. 3, there is shown an embodiment of the source device 202 such as source device 110 of FIG. 1 and alternative embodiments (FSK modulators 300 and 370) of the FSK modulator 210 shown in FIG. 2. The source device 202 comprises one particular embodiment of the source device 110 or at least one particular example of part of the source device 110. The source device 202 may maintain the "data" that includes an identification number of a light source in a memory 206. In some embodiments, the memory 206 may comprise non-volatile memory such as flash memory or read only memory. In other embodiments, the memory 206 may comprise volatile memory. In many embodiments, the memory 206 comprises a unique, identification number of the light source and that identification number may be assigned at the time of manufacture of the light source. In other embodiments, the unique, identification number may be assigned upon installation or may be assigned via a data interface for a network such as network 115 of FIG. 1. In one embodiment, the identification number of a light source such as light source 130 may be indicative of the location of the light source so that the receiving device 170 may be able to decode or otherwise calculate the coordinates of the light source with the identification number. In another embodiment, the coordinates of the light source may be embedded in the identification number for the light source.

In the present embodiment, the memory 206 comprises bits representing the "SFD", bits representing the "data" to transmit via a light source, and bits representing a "CRC" cyclic redundancy check. The CRC may allow a receiving device to verify that the "data" received by the receiving device matches, to some degree of accuracy, the "data" in memory 206. The source device 202 copies the SFD, data, and CRC into a bit shift circulating register 207 in parallel and the register 207 shifts the bits out through to create the data signal 205. Once all the bits are shifted out of register 207, the source device 202 copies the SFD, data, and CRC into a bit shift circulating register 207 in parallel again to repeat the signal. For example, the SFD may comprise two bits of data that are just fillers or are bits representing the SFD. The data may comprise the identification number for the light source and the CRC may comprise a four-bit CRC such as a sum of the bits in the data.

In alternative embodiments, the memory 206 may comprise only the data and in some embodiments, the data only comprises the identification number associated with the light source. In other embodiments, the memory 206 comprises the data and the CRC.

FSK modulator 300 comprises logic 305, oscillation device 307 with oscillators 310-330, and multiplexer 350. Other embodiments implement different circuit elements to accomplish the same output. Logic 305 may comprise a circuit to associate inputs of bits of data with distinct outputs. Logic 305 receives data 205 and identifies one or more SFD bits. The value of the SFD bits may not be important for many embodiments. The number of SFD bits may represent the increments of time to continue outputting a delimiter frequency such as a frequency from oscillator 310 to identify the SFD to the receiving device. After identifying the SFD bit, logic 305 outputs a selection signal 306 associated with the bit to MUX 350 to select oscillator 310 to output the delimiter frequency via the output signal 219.

Thereafter, or at least until receiving the next SFD bit, the logic 305 may identify a bit of the data 205 and output a selection signal 306 associated with the bit to MUX 350. For instance, the oscillator 320 may output the frequency associated with a logical 0 and the oscillator 330 may output the frequency associated with a logical 1. The frequency signals from oscillators 310, 320, and 330 are coupled with the input of MUX 350. For example, oscillator 310 may output a signal with a frequency of 75 Hz, oscillator 320 may output a signal with a frequency of 60 Hz, and oscillator 330 may output a signal with a frequency of 90 Hz.

MUX 350 selects the appropriate frequency signal as the output signal 219 based upon the selection signal 306 from logic 305. Other embodiments may utilize the data 205 as the selection signal for the bits of data after transmission of the delimiting frequency.

FSK modulator 370 comprises logic 380 coupled with VCO 390. In this embodiment, the voltage of the output from logic 380 determines the frequency of the output signal 219 from VCO 390. For example, logic 380 may output a selection signal of zero volts in response to receipt of a logical zero, three volts in response to receipt of an SFD bit, and six volts in response to receipt of a logical one. Other embodiments may utilize different voltages.

In further embodiments, FSK modulator 370 may couple other circuit elements with the output of VCO 390 to adjust characteristics of the output to generate output signal 219. For instance, a capacitance and/or resistance may filter the output of the VCO 390 to generate output signal 219. In other embodiments, a couple transistors coupled with the output of the VCO 390 may convert the output into a square wave at a selected voltage. In another embodiment, the bit response frequency patterns may be generated digitally, sampled at a high rate to form "chips", stored in memory and played back via a corresponding high rate clocking circuit.

Figure 4:
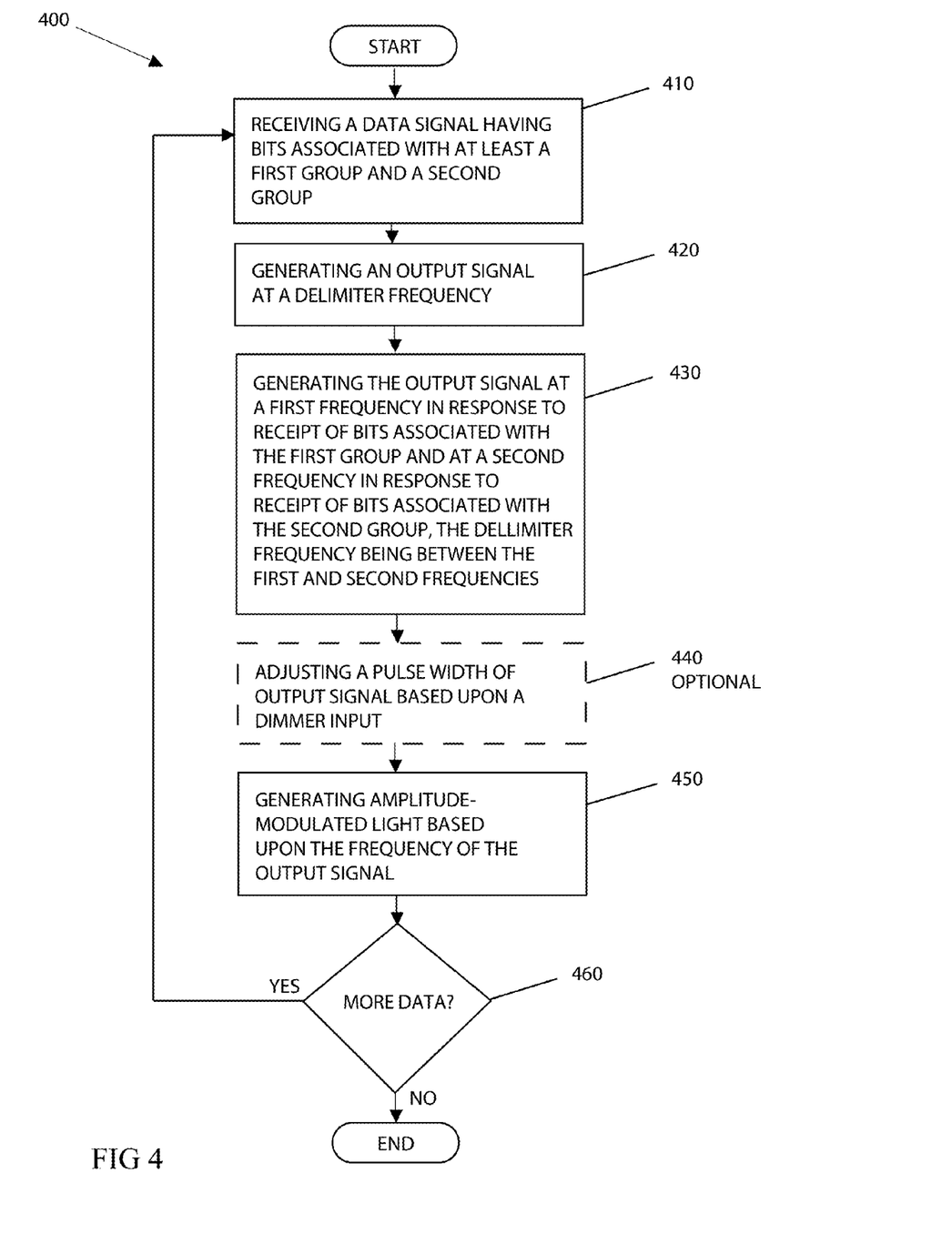
FIG. 4 illustrates a flow chart of an embodiment to transmit data by varying a frequency of an amplitude-modulated light source.

FIG. 4 illustrates a flow chart 400 of an embodiment to transmit data by varying a frequency of an amplitude-modulated light source. The embodiment involves transmission of data via a light source such as is described with respect to FIGS. 1-3. Flow chart 400 begins with receiving, by a frequency shift keying (FSK) modulator, a data signal having bits associated with at least a first group such as logical zeros and a second group such as logical ones, wherein the first group is associated with a first frequency and the second group is associated with a second frequency (element 410). In many embodiments, a group of one or more logical zeros and/or logical ones may be associated with a delimiter frequency to represent the SFD. For example, the FSK modulator may receive the data signal and as the data is received via the data signal, the FSK modulator may determine variations in the frequency of amplitude modulation of the light source to transmit the data from the data signal to a receiving device via the light emanating from the light source. Note that the light source may comprise any electromagnetic radiator that can be amplitude modulated.

The FSK modulator may identify the SFD by generating the output signal at the delimiter frequency for a number of clock cycles (element 420). In some embodiments, the number of bits associated with the SFD may represent the number of clock cycles.

After outputting the delimiter frequency, the FSK modulator may generate an output signal at the first frequency in response to receipt of bits associated with the first group (element 430) and may generate the output signal at the second frequency in response to receipt of bits associated with the second group (element 440). For instance, the FSK modulator may receive a logical 0 and generate a first frequency representative of the logical 0. The FSK modulator may then receive a logical 1 and generate a second frequency representative of the logical 1. The FSK modulator may continue to generate the first frequency and the second frequency representative of the data received via the data signal until all the data is output or no more data (element 460) is received via the data signal. In other embodiments, the FSK modulator may output the delimiter frequency and then repeat the same signal by starting again at element 410.

In some embodiments, after generating the first frequency representative of the logical 0, the FSK modulator may couple with a pulse width modulator to apply pulse-width modulation to the light source to impose a duty cycle based upon input such as input from a dimmer switch (element 440). The pulse width modulator may maintain the first frequency as the frequency of modulation of the light source while adjusting the pulse width to adjust the intensity of the light emitted from the light source.

After generating the first frequency representative of the logical 0, the FSK modulator may apply the frequency to a light source via an amplitude modulator to adjust the frequency of amplitude modulation to the first frequency (element 450). After receiving more data (element 460) such as data representing the SFD, the FSK modulator may change the output signal to the delimiter frequency to represent the SFD and may apply the delimiter frequency to the light source to adjust the frequency of amplitude modulation to the delimiter frequency (element 420).

Figure 5:
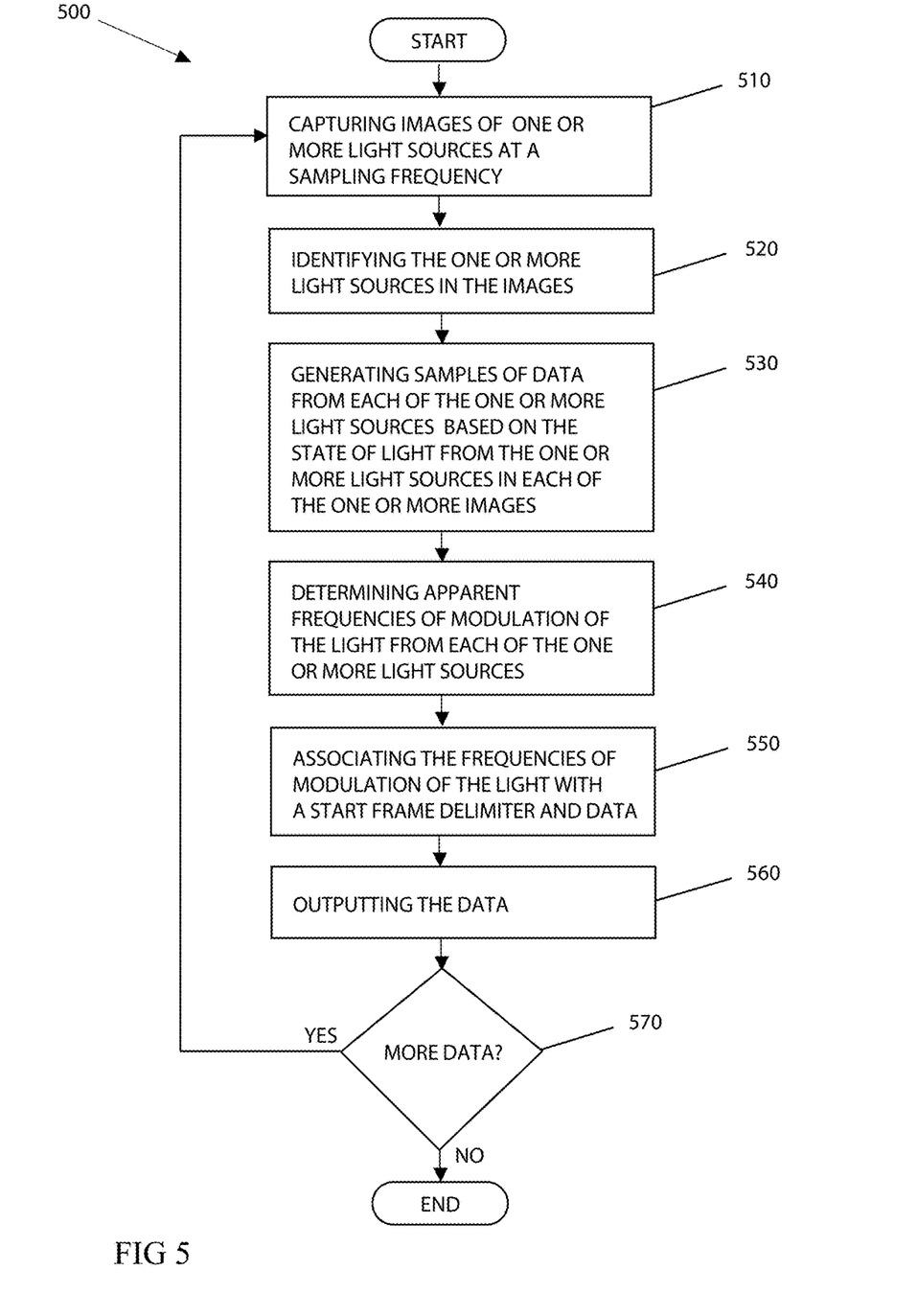
FIG. 5 illustrates a flow chart of an embodiment to receive data by varying a frequency of an amplitude-modulated light source.

FIG. 5 illustrates a flow chart 500 of an embodiment to receive data by varying a frequency of an amplitude-modulated light source. Flow chart 500 begins with capturing images of one or more light sources at a sampling frequency (element 510). For instance, a user may have an iPhone (the receiving device) and may walk into an office building on the way to meet with a person maintaining an office in the building. The iPhone may capture images of the light sources as the user walks into the building. At least some of the light sources may be electromagnetic radiators that are frequency modulated at frequencies that the identify data to the iPhone such as 1×, 1.25× and 1.5× of the sampling frequency of the camera on the iPhone.

The iPhone may identify the one or more light sources that are electromagnetic radiators in the captured images (element 520) and may generate samples based upon light received (element 530). For example, a camera of the iPhone (the light detector) may receive light and, in response, generate an output signal including samples of the waveform of the light received from each of the light sources such as a first magnitude to indicate that the light is on in an image and a second magnitude to indicate that the light is off in an image. In some embodiments, the light may be visible light while, in other embodiments, the light may be infrared light or ultraviolet light.

The FSK demodulator may receive the output signal from the light detector and determine, based upon the characteristics of the output signal, the data that the light represents. In many embodiments, the FSK demodulator may comprise logic to determine the apparent frequency of the modulation of the light received from each of the light sources (element 540) and, based upon the frequency, determine data or one or more bits of data to associate with the light (element 550). For instance, the light may be amplitude modulated at three different frequencies: the first frequency of N*Fs, a second frequency of (N+1/2)*Fs, and a delimiter frequency between the first frequency and the second frequency. The FSK modulator may determine the component frequencies of the amplitude modulation of the light and associate the component frequencies with a pattern of logical ones and zeros based upon the amplitude or magnitude of the component frequencies. The FSK demodulator may comprise a data associator to associate frequencies with logical ones or zeros and SFD logic to identify the start frame delimiter. In many embodiments, the data associator may utilize a table that associates frequencies of modulation of light with data. In other embodiments, the data associator may comprise logic to associate the frequencies with data. And, in some embodiments, the logic may comprise a state machine to associate the frequencies with data.

The FSK demodulator may output the data associated with the light (element 560) and then determine whether additional data is transmitted via the light (element 570). In some embodiments, the FSK demodulator continues to determine the identification numbers from the data transmitted by the light to update the location of the receiving device as the user moves through the building.

The FSK demodulator may be implemented within a processor-based device such as a smart phone or a laptop. A camera built-into or otherwise coupled with the processor-based device may operate as the light detector and the FSK demodulator may comprise logic in the form of code and/or hardware within the processor-based device. In other embodiments, the FSK demodulator may be a distinct device and may couple with the processor-based device.

Another embodiment is implemented as a program product for implementing systems and methods described with reference to FIGS. 1-5. Embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet adapter cards are just a few of the currently available types of network adapters.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It will be apparent to those skilled in the art having the benefit of this disclosure that the present disclosure contemplates transmitting data by varying a frequency of amplitude-modulation of a light source to generate light and receiving the data by undersampling frequencies of modulation of the light. It is understood that the form of the embodiments shown and described in the detailed description and the drawings are to be taken merely as examples. It is intended that the following claims be interpreted broadly to embrace all variations of the example embodiments disclosed.

Although the present disclosure has been described in detail for some embodiments, it should be understood that various changes, substitutions, and alterations could be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus of a wireless communication device configured for visible-light communications (VLC), the apparatus comprising:

memory; and processing circuitry, configured to:

decode a data frame in accordance with under-sampled frequency shift on-off keying (UFSOOK), the data frame conveyed by visible light, the data frame comprising a start frame delimiter followed by data in which a first logical level is represented by a first on-off keying (OOK) frequency and second logical level is represented by a second OOK frequency;

wherein, in accordance with the UFSOOK, the processing circuitry is to:

configure light detection circuitry to under-sample the visible light at a sampling frequency (Fs) to generate samples, the first OOK frequency being an integer multiple of the sampling frequency, the second OOK frequency being an integer plus half multiple of the sampling frequency; and decode the samples to provide output data, wherein a predetermined timber of samples are decoded to represent each bit of the output data, and wherein to decode the samples, the processing circuitry is configured to generate the first logical level when an output of the light detection circuitry does not change state over the predetermined number of samples, and generate the second logical level when the output of the light detection circuitry changes state over the predetermined number of samples.

2. The apparatus of claim 1 wherein the sampling frequency corresponds to a sample rate, and
wherein each bit of the output data is represented by at least two of the samples to provide a bit rate that is less than or equal to half the sample rate.

3. The apparatus of claim 2 wherein the samples correspond to camera frames that are generated at a camera frame rate and each bit of output data is represented by at least two camera frames.

4. The apparatus of claim 2 wherein the processing circuitry is configured to decode the start frame delimiter, the start frame delimiter comprising two samples of high-frequency OOK followed by two samples of UFSOOK at the second OOK frequency, the high frequency OOK comprising a frequency higher than a highest of the first and second OOK frequencies.

5. The apparatus of claim 4 wherein the first logical level corresponds to a logical zero and the second logical level corresponds to a logical one.

6. The apparatus of claim 4 wherein the first logical level corresponds to a logical one and the second logical level corresponds to a logical zero.

7. The apparatus of claim 4 wherein the data is encoded on visible light at a transmitter in which the first logical level corresponds to an even number of cycles per bit transmitted for one bit period, and a second logical level corresponds to an odd number of cycles per bit transmitted for one bit period.

8. The apparatus of claim 7 wherein the cycles comprise on-off cycles of visible light.

9. The apparatus of claim 8 wherein the first and second OOK frequencies are greater than a persistence of a human eye.

10. The apparatus of claim 9 wherein the first and second OOK frequencies are greater than 60 Hz.

11. The apparatus of claim 9 wherein the first and second OOK frequencies are greater than 100 Hz.

12. The apparatus of claim 1 further comprising the light detection circuitry, the light detection circuitry configured to receive the visible light, the light detection circuitry comprising a light detector; and
wherein the processing circuitry comprises a UFSOOK decoder.

13. The apparatus of claim 1 wherein the frame is configured in accordance with an IEEE 802.15 standard for wireless visible light communication (VLC).

14. A non-transitory computer-readable storage medium that stores instructions for execution by processing circuitry of a wireless device configured for visable-light communications, the instructions to configure the wireless communication device to perform operations to:
decode a data frame of visible light in accordance with under-sampled frequency shift on-off keying (UFSOOK), the data frame comprising a start frame delimiter followed by data in which a first logical level is represented by a first on-off keying (OOK) frequency and second logical level is represented by a second OOK frequency;
wherein, in accordance with the UFSOOK, the processing circuitry is to:
under-sample the visible light at a sampling frequency (Fs) to generate samples, the first OOK frequency being an integer multiple of the sampling frequency, the second OOK frequency being an integer plus half multiple of the sampling frequency; and
decode the samples to provide output data,
wherein a predetermined number of samples are decoded to represent each bit of the output data, and
wherein to decode the samples, the processing circuitry is configured to generate the first logical level when the sample value does not change over the predetermined number of samples, and generate the second logical level when the sample value changes over the predetermined number of samples.

15. The non-transitory computer-readable storage medium of claim 14,
wherein the processing circuitry is to configure light-detection circuitry to under-sample the visible light at the sampling frequency (Fs) to generate the samples, and
wherein to decode the samples, the processing circuitry is configured to generate the first logical level when an output of the light detection circuitry does not change state over the predetermined number of samples, and generate the second logical level when the output of the light detection circuitry changes state over the predetermined number of samples.

16. The non-transitory computer-readable storage medium of claim 15 wherein the sampling frequency corresponds to a sample rate, and
wherein each bit of the output data is represented by at least two of the samples to provide a bit rate that is less than or equal to half the sample rate.

17. The non-transitory computer-readable storage medium of claim 16 wherein the samples correspond to camera frames that are generated at a camera frame rate and each bit of output data is represented by at least two camera frames.

18. The non-transitory computer-readable storage medium of claim 16 wherein the processing circuitry is configured to decode the start frame delimiter, the start frame delimiter comprising two samples of high-frequency OOK followed by two samples of UFSOOK at the second OOK frequency, the high frequency OOK comprising a frequency higher than a highest of the first and second OOK frequencies.

19. An apparatus of a wireless communication device configured for light communications, the apparatus comprising:
memory; and processing circuitry, the processing circuitry comprising an on-off keying (OOK) encoder, the processing circuitry configured to:
encode a data frame for modulation on light, the data frame to include a start frame delimiter followed by data in which a first logical level is represented by a first OOK frequency and a second logical level is represented by a second OOK frequency, the first OOK frequency being an integer multiple of a sampling frequency for decoding in accordance with under-sampled frequency shift on-off keying (UFSOOK), the second OOK frequency being an integer plus half multiple of the sampling frequency; and
modulate an optical source for transmission of the data frame at a light wavelength,
wherein the first logical level corresponds to an even number of cycles per bit transmitted for one bit period, and the second logical level corresponds to an odd number of cycles per bit transmitted for one bit period.

20. The apparatus of claim 19 wherein each bit period corresponds to a predetermined number samples.

21. The apparatus of claim 20 wherein the start frame delimiter comprises two samples of high-frequency OOK followed by two samples of UFSOOK at the second OOK frequency, the high frequency OOK comprising a frequency higher than a highest of the first and second OOK frequencies.

22. The apparatus of claim 21 wherein the light comprises either ultraviolet light or infrared light.

23. The apparatus of claim 21 wherein the light comprises visible light,
  wherein the cycles comprise on-off cycles of visible light, and
  wherein the first and second OOK frequencies are greater than a persistence of a human eye.

24. The apparatus of claim 23 wherein a duty cycle of the first OOK frequency and the second OOK frequency is fifty percent.

25. The apparatus of claim 24 wherein the processing circuitry is configured to reduce the duty cycle for dimming.

26. The apparatus of claim 19 wherein the first logical level corresponds to a logical zero and the second logical level corresponds to a logical one.

27. The apparatus of claim 19 wherein the first logical level corresponds to a logical one and the second logical level corresponds to a logical zero.

* * * * *

UNITED STATES PATENT AND TRADEMARK OFFICE
CERTIFICATE OF CORRECTION

PATENT NO. : 9,838,121 B2  
APPLICATION NO. : 15/132612  
DATED : December 5, 2017  
INVENTOR(S) : Roberts et al.

Page 1 of 1

It is certified that error appears in the above-identified patent and that said Letters Patent is hereby corrected as shown below:

On the Title Page

On page 3, in Column 2, item [56] under "Other Publications", Line 11, delete "/,"International" and insert --"International-- therefor On page 3, in Column 2, item [56] under "Other Publications", Line 29, delete "Wikikipedia," and insert --Wikipedia,-- therefor In the Claims In Column 17, Line 51, in Claim 13, delete "visible light" and insert --visible-light-- therefor Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*